United States Patent
Meckley et al.

(10) Patent No.: US 7,480,688 B2
(45) Date of Patent: Jan. 20, 2009

(54) PHASE PERSISTENT AGILE SIGNAL SOURCE METHOD, APPARATUS, AND COMPUTER PROGRAM PRODUCT

(75) Inventors: Jeffrey L. Meckley, Glenville, PA (US); Thomas P. McGrath, Lutherville, MD (US); William F. McClelland, Finksburg, MD (US); Robert J. Baummer, Jr., Towson, MD (US)

(73) Assignee: AAI Corporation, Hunt Valley, MD (US)

( * ) Notice: Subject to any disclaimer, the term of this patent is extended or adjusted under 35 U.S.C. 154(b) by 408 days.

(21) Appl. No.: 11/289,783

(22) Filed: Nov. 30, 2005

(65) Prior Publication Data

US 2006/0136537 A1   Jun. 22, 2006

Related U.S. Application Data

(60) Provisional application No. 60/631,602, filed on Nov. 30, 2004.

(51) Int. Cl.
    *G06G 1/02* (2006.01)
(52) U.S. Cl. ...................................... 708/271
(58) Field of Classification Search .......... 708/270–277
    See application file for complete search history.

(56) References Cited

U.S. PATENT DOCUMENTS

| 5,473,274 | A | | 12/1995 | Reilly et al. |
| 5,644,602 | A | | 7/1997 | Critchlow et al. |
| 5,770,977 | A | * | 6/1998 | Uurtamo ...................... 331/40 |
| 5,963,607 | A | * | 10/1999 | Romano et al. ............. 708/271 |
| 7,034,624 | B1 | * | 4/2006 | Gentile ......................... 331/34 |
| 2003/0174784 | A1 | * | 9/2003 | Samarasooriya et al. .... 375/308 |
| 2005/0248374 | A1 | * | 11/2005 | Kushnick .................... 327/105 |

\* cited by examiner

*Primary Examiner*—Chat C Do
(74) *Attorney, Agent, or Firm*—Venable LLP; James R. Burdett; Jeffri A. Kaminski

(57) ABSTRACT

A phase persistent agile signal source method, apparatus, and/or computer program product provides a direct digital synthesizer (DDS) clock rate, provides a frequency tuning word (FTW) for a desired output frequency, provides a DDS update for a desired DDS update rate, provides an equivalent frequency least significant bit (LSB) for the desired DDS update rate, provides a current phase of an LSB accumulator, and generates a coherent phase of the desired output frequency based on the DDS clock rate, FTW, DDS update rate to the DDS, equivalent LSB for the desired DDS update rate, and current phase of the LSB accumulator. The coherent phase can be the fraction portion of the result obtained from the multiplication of the FTW and the current phase of the LSB accumulator.

19 Claims, 2 Drawing Sheets

PHASE PERSISTENT AGILE SIGNAL SOURCE METHOD, APPARATUS, AND COMPUTER PROGRAM PRODUCT

CROSS-REFERENCE TO RELATED APPLICATION

This application claims the benefit of U.S. Provisional Patent Application Ser. No. 60/631,602, filed Nov. 30, 2004, which is incorporated herein by reference.

BACKGROUND OF THE INVENTION

1. Field of the Invention

The present invention relates generally to signal generating methods and devices and, more particularly, to a phase persistent agile signal source method, apparatus, and/or computer program product.

2. Description of the Related Art

Signal frequency generation can be achieved in a number of ways including direct digital frequency synthesis, phase-locked-loop frequency synthesis, fractional-N frequency synthesis, etc. Advances in integrated circuit technology over the recent past have resulted in more widespread use of direct digital synthesizers (DDSs) in signal frequency generation. DDSs generate programmable analog output waveforms with high resolution and accuracy, and are able to rapidly switch between output frequencies. A DDS generates a waveform by storing the points of the waveform in digital format, and then recalling them to generate the waveform. The rate at which the DDS completes one waveform governs the output frequency.

The DDS output frequency is changed by changing the phase increment of the phase accumulator. The phase increment determines how many data points the DDS skips between the ones it sends to the digital-to-analog converter (DAC). The DDS accumulates the skip values to determine the values that are sent to the DAC. This accumulator has history of all prior programmed frequencies. When the DDS output frequency changes from a first frequency to a second substantially higher or lower frequency, and then back to the first frequency, the second occurrence of the first frequency normally does not have the same phase as the first occurrence of the first frequency. This is due to the history of all prior frequencies stored in the accumulator of the DDS. It would be desirable to track phase of the output frequency of a DDS to maintain the time continuous phase of the DDS output frequency when the DDS is programmed to any other arbitrary output frequency. If the DDS output frequency is reprogrammed to a previous DDS output frequency, the phase would then be continuous, as though it never left the original frequency.

Therefore, a need exists for a phase persistent agile signal source method, apparatus, and/or computer program product.

SUMMARY OF THE INVENTION

Embodiments of the present invention provide a phase persistent agile signal source method, apparatus, and/or computer program product. The phase persistent agile signal source method, apparatus, and/or computer program product provides a direct digital synthesizer (DDS) clock rate, provides a frequency tuning word (FTW) for a desired output frequency, provides a DDS update for a desired DDS update rate, provides an equivalent frequency least significant bit (LSB) for the desired DDS update rate, provides a current phase of an LSB accumulator, and generates a coherent phase of the desired output frequency based on the DDS clock rate, FTW, DDS update rate to the DDS, equivalent LSB for the desired DDS update rate, and current phase of the LSB accumulator.

The DDS update rate is a sub multiple of the DDS clock rate. The maximum usable DDS update rate can be determined by the time required to write to all applicable internal DDS registers and the time required for the DDS update command to propagate to the output of the DDS. The equivalent frequency LSB of the desired DDS update rate can be obtained by multiplying the LSB of the FTW, typically one, by the DDS clock rate and dividing by the DDS update rate. The addition of the current phase of the LSB accumulator and the equivalent frequency LSB can be the current phase of the LSB accumulator. The coherent phase can be the fractional portion of the product resulting from the multiplication of the FTW and the current phase of the LSB accumulator. The fractional portion of the coherent phase can be that portion of the product that is less than 360 degrees with the LSBs truncated to fit the size of the phase register in the DDS.

DETAILED DESCRIPTION OF THE PREFERRED EMBODIMENTS

Figure 1:
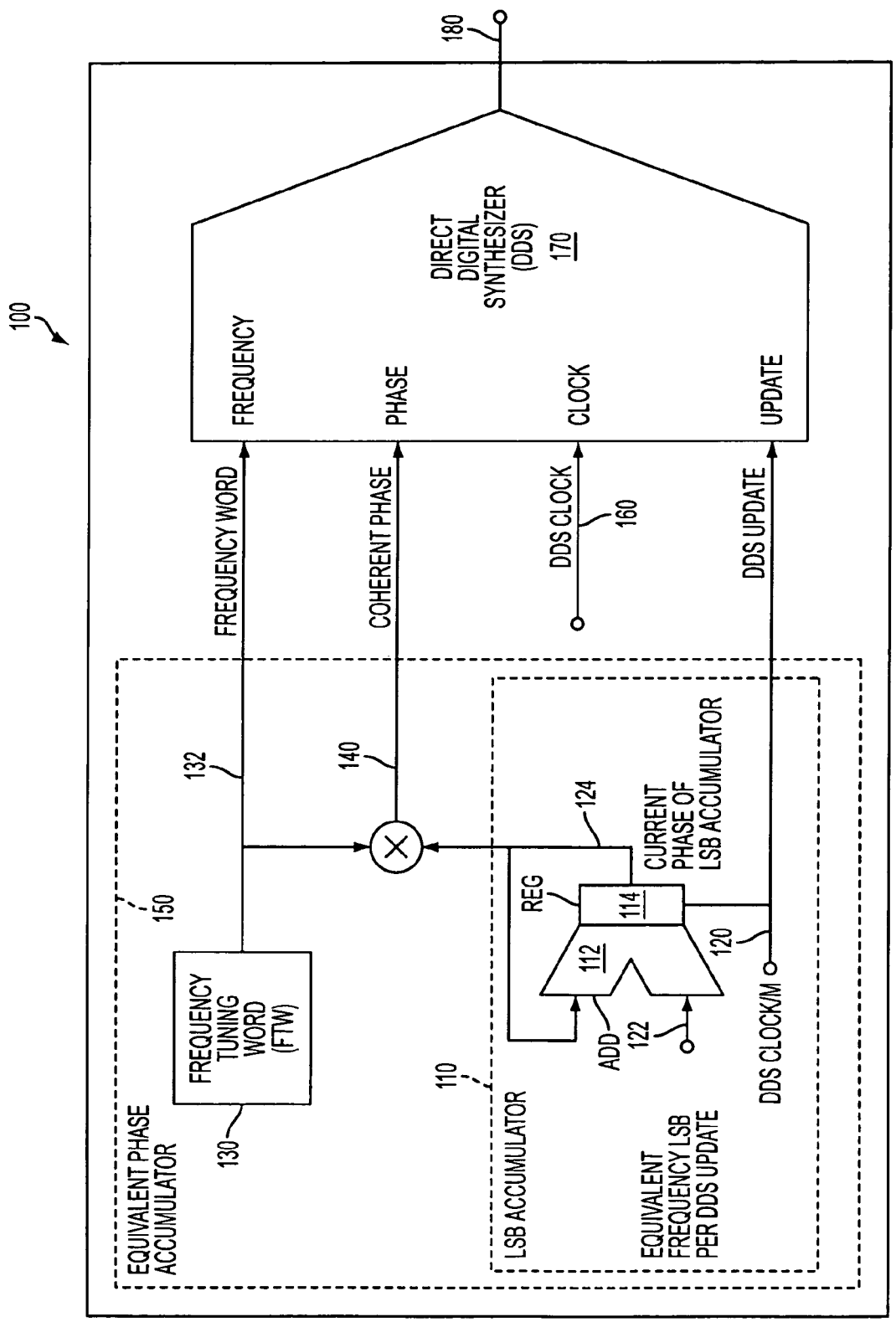
FIG. 1 is a block diagram of a phase persistent agile signal source according to the present invention.

Embodiments of the present invention is present invention is a phase persistent agile signal source method, apparatus, and/or computer program product. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Referring to the drawings, FIG. 1 shows phase persistent agile signal source circuitry 100 according to an embodiment of the present invention. The phase persistent agile signal source circuitry 100 includes an equivalent phase accumulator 150 and a DDS 170. The phase persistent agile signal source circuitry 100 may be configured to provide phase tracking for any and all frequencies within the limitations of the DDS process. This allows each frequency to maintain its time continuous phase while the DDS is programmed to any other arbitrary frequency. When a frequency is reprogrammed to a previous frequency, the phase is continuous, as though it never left the original frequency.

The phase persistent agile signal source circuitry 100 can be configured as circuitry according to the desires of the user, such as in the form of a field programmable gate array, a digital signal processing microprocessor, a plurality of discrete digital logic blocks, software, combinations thereof, etc. The DDS 170 can be configured in the form of any desired DDS circuitry. The DDS 170 has components that may include a phase accumulator, phase-to-amplitude conversion circuitry, and a digital-to-analog converter (DAC). The DDS 170 produces a desired frequency output that depends on a reference clock frequency and a binary number programmed into the frequency register that is referred to as the Frequency Tuning Word (FTW) 132. The FTW 132 provides the main input to the phase accumulator. If a look-up table is used for the phase-to-amplitude circuitry, the phase accumulator computes a phase (angle) address for the look-up table. The look-up table outputs the digital value of an amplitude corresponding to that phase (angle) address.

The DAC converts the digital value of the amplitude to a corresponding value of analog voltage or current. To generate a fixed-frequency sine wave, for example, a constant value (e.g., the phase increment determined by the FTW 132) is added to the phase accumulator with each clock cycle. If the phase increment is large, the phase accumulator steps quickly through the look-up table and generates a high frequency output waveform. If the phase increment is small, the phase accumulator takes many more steps and generates a lower frequency output waveform.

An equivalent phase accumulator may include a programmable register for programming the FTW 132. The equivalent phase accumulator has a least significant bit (LSB) accumulator 110 with addition (ADD) logic 112 and a register (REG) 114 for tracking the phase of the lowest frequency the DDS 170 is capable of generating. An equivalent frequency LSB for a desired DDS update rate 122 is provided as input to the ADD logic 112. The current phase 124 of the LSB accumulator is added to the equivalent frequency LSB for a desired DDS update rate 122 in the ADD logic 112 to generate the current phase 124 of the LSB accumulator for the next DDS update. The equivalent frequency LSB for the desired DDS update rate M 122 is equal to the LSB of the FTW 132 times the DDS clock rate 160 divided by the DDS update rate. The current phase 124 of the LSB accumulator is multiplied by the FTW 132 to produce the coherent phase. The fractional portion of the coherent phase is written to the phase register of the DDS 170 along with the write of the FTW 132 to the frequency register. The FTW 132 is multiplied by the current phase 124 of the LSB phase accumulator to produce the coherent phase 140 that is based on the DDS clock rate, FTW, DDS update rate to the DDS, equivalent LSB for the desired DDS update rate, and current phase of the LSB accumulator. The FTW 132, coherent phase 140, DDS clock 160 and DDS update are provided to the DDS 170.

The FTW 132 is multiplied by time in the phase accumulator of the DDS 170 to produce the instantaneous phase of the currently programmed frequency. Time is the product of the period of the DDS clock 160 and the number of occurrences of that clock. This function is duplicated in the equivalent phase accumulator circuitry 150 in order to maintain continuous phase control. The multiplication of the FTW 132 is extracted into a separate operation to allow one phase accumulator the ability to track the phase of any frequency the DDS 170 can generate. The LSB accumulator 110 may be clocked at a division of the DDS clock 160 because it is not necessary or practical to clock the LSB accumulator 110 at the same rate as the DDS accumulator. The size of the LSB accumulator 110 is equal to the size of the phase accumulator of the DDS 170. The multiplication of the FTW 132 sent to the DDS 170 and the instantaneous value of the current phase of the LSB accumulator 110 utilize all the bits in these values to maintain the precision required for continuous phase control. Some most significant bits (MSBs) of the FTW 132 can be dropped off if they are not utilized (always zero) to decrease the size of the multiplier. The fractional portion of the product can be loaded into the phase accumulator of the DDS 170. If the DDS 170 does not allow access to loading the phase accumulator, the phase accumulator should be reset and the fractional portion of the coherent phase should be loaded into the phase offset register of the DDS 170. The LSBs of the fractional portion of the coherent phase can be dropped to match the size of the phase offset register in the DDS 170.

The following exemplary table compares the known DDS phase for a 10 MHz signal to the phase calculated by the coherent phase algorithm of the present invention for signal switching between 10 MHz and 45 MHz in an Analog Device AD9858. The AD9858 contains a thirty-two bit phase accumulator that is clocked at a one GHz rate. The known phase is generated by accumulating the FTW 132 in a thirty-two bit register. The FTW 132 is equal to the desired output frequency times $2^{32}$ divided by $1e^9$. The phase word is defined in this example to be the top fourteen bits of the accumulated FTW. The phase in degrees can be found from the phase word by multiplying the phase word by 360 divided by $2^{14}$.

The calculated phase is generated by a coherent phase algorithm according to an embodiment to the present invention. In this algorithm a thirty-two bit counter increments by 240 every 240 nanoseconds (ns). This counter is multiplied by the thirty-two bit FTW 132 to find the coherent phase for the current FTW 132. This multiplication generates a sixty-four bit result, labeled bits sixty-three down to zero. Bits thirty-one down to eighteen are equal to the fourteen bit phase word. The method accumulates only time, so it can find the coherent phase for any frequency at a 240 ns interval by multiplying the phase counter by the frequency. The 240 ns interval is dictated by the speed of writing to all required DDS 170 registers and the latency of the commanded update through the DDS 170. A faster counter could accumulate the value of one every nanosecond, which would allow the coherent phase to be determined every nanosecond. By changing the speed of the counter and/or its accumulated value the coherent phase for any interface speed and output latency of the DDS 170 can be generated. This allows the method to be tailored to any DDS device, not just the AD9858 DDS.

| Time(ns) | Known DDS Phase for 10 MHz | |
|---|---|---|
| | | Calculated Phase for 10 MHz |
| 240 | 143.99 | 143.99 |
| 480 | 288 | 288 |
| 720 | 71.982 | 71.982 |
| 960 | 215.99 | 215.99 |
| 1200 | 359.98 | 359.98 |
| 1440 | 143.99 | 143.99 |
| 1680 | 288 | 288 |
| 1920 | 71.982 | 71.982 |
| 2160 | 215.99 | 215.99 |
| 2400 | 359.98 | 359.98 |
| 2640 | 143.99 | 143.99 |
| 2880 | 288 | 288 |
| 3120 | 71.982 | 71.982 |
| 3360 | 215.99 | 215.99 |
| 3600 | 359.98 | 359.98 |
| | | Calculated Phase for 45 MHz |
| 3840 | 143.99 | 288 |
| 4080 | 288 | 215.99 |
| 4320 | 71.982 | 143.99 |
| 4560 | 215.99 | 71.982 |
| 4800 | 359.98 | 359.98 |
| 5040 | 143.99 | 288 |
| 5280 | 288 | 215.99 |
| 5520 | 71.982 | 143.99 |
| 5760 | 215.99 | 71.982 |
| 6000 | 359.98 | 359.98 |
| 6240 | 143.99 | 288 |
| 6480 | 288 | 215.99 |
| | | Calculated Phase for 10 MHz |
| 6720 | 71.982 | 71.982 |
| 6920 | 215.99 | 215.99 |
| 7200 | 359.98 | 359.98 |

-continued

| Time(ns) | Known DDS Phase for 10 MHz | |
|---|---|---|
| 7440 | 143.99 | 143.99 |
| 7680 | 288 | 288 |
| 7920 | 71.982 | 71.982 |
| 8160 | 215.99 | 215.99 |
| 8400 | 359.98 | 359.98 |
| 8640 | 143.99 | 143.99 |
| 8880 | 288 | 288 |
| 9120 | 71.982 | 71.982 |
| 9360 | 215.99 | 215.99 |
| 9600 | 359.98 | 359.98 |
| 9840 | 143.99 | 143.99 |

Figure 2:
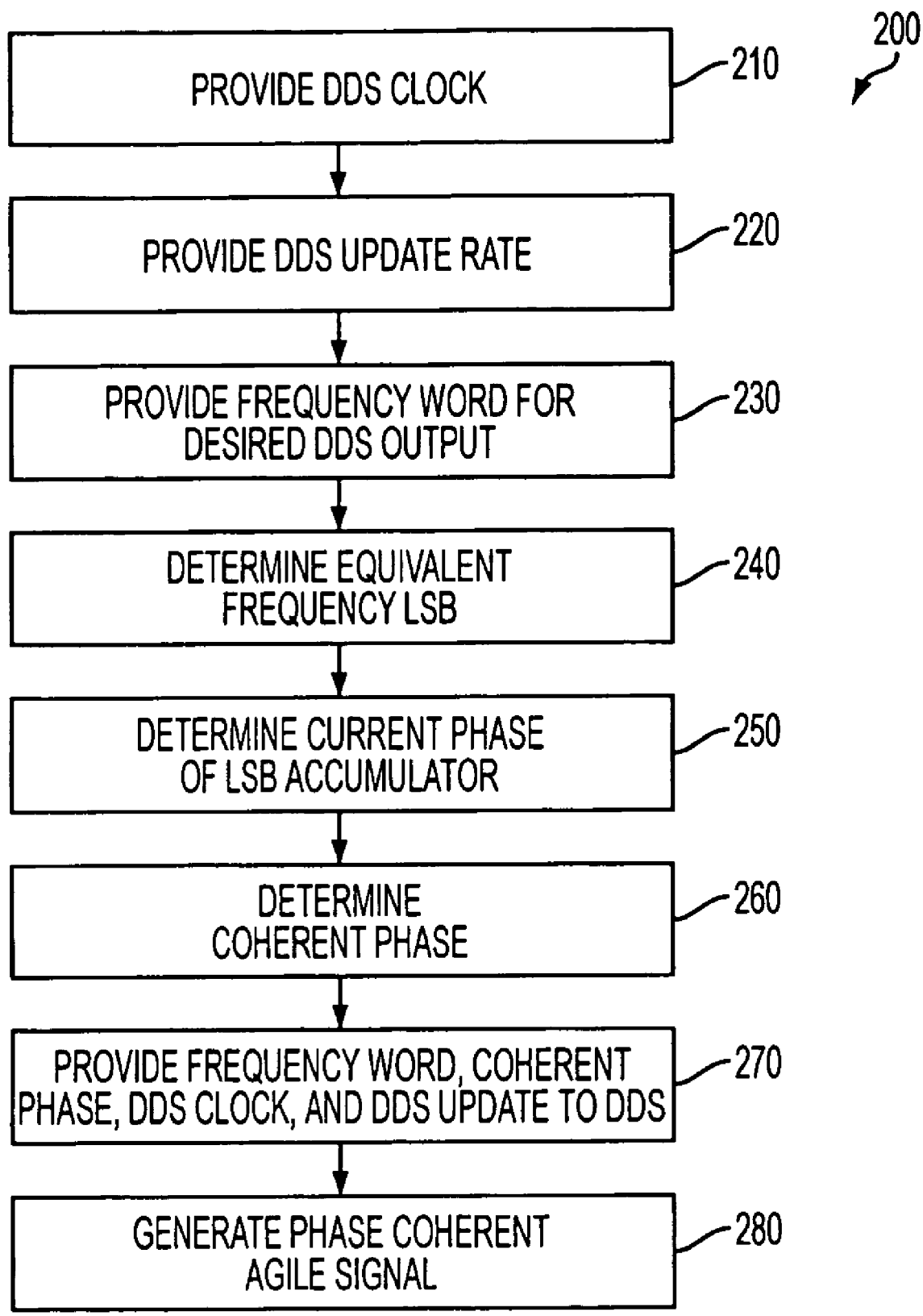
FIG. 2 is a flow chart of phase persistent agile signal source process according to the present invention.

A computer program product implementation of an embodiment of the present invention embodies phase persistent agile signal source instructions on a computer readable medium that carry out the method of the present invention. Referring to FIG. 2, the phase persistent agile signal source instructions, when executed by a processor, carry out steps 200 that can provide a DDS clock rate (step 210), provide a DDS update rate a desired DDS update rate (step 220), provide an FTW for a desired output frequency (step 230), provide an equivalent LSB for a desired DDS update rate (step 240), determine a current phase of an LSB accumulator (step 250), determine a coherent phase for the provided FTW (step 260), provide the FTW, coherent phase, DDS clock rate, and DDS update rate to the DDS (step 270), and generate a phase coherent agile signal (step 280) based on the DDS clock rate, FTW, DDS update rate to the DDS, equivalent LSB for the desired DDS update rate, and current phase of the LSB accumulator. The computer program product performs the functions of the phase persistent agile signal source described above.

Attached Appendix A shows an example of phase coherency simulation code. Attached appendix B shows an example of coherent phase algorithm code. Attached appendix C shows an example of automatic test bench for phase accumulator code. The codes shown in Appendices A, B, and C are merely exemplary and can be configured in any desired code according to the desires of the user.

In summary, a phase persistent agile signal source method, apparatus, and/or computer program product according to an embodiment of the present invention provides a direct digital synthesizer (DDS) clock rate, provides a frequency tuning word (FTW) for a desired output frequency, provides a DDS update for a desired DDS update rate, provides an equivalent frequency least significant bit (LSB) for the desired DDS update rate, provides a current phase of an LSB accumulator, and generates a coherent phase of the desired output frequency based on the DDS clock rate, FTW, DDS update rate to the DDS, equivalent LSB for the desired DDS update rate, and current phase of the LSB accumulator.

The providing an equivalent frequency step can obtain the equivalent frequency LSB of the desired DDS update rate by multiplying the LSB of the FTW, typically one, by the DDS clock rate and dividing by the DDS update rate. The providing a current phase step can add the current phase of the LSB accumulator to the equivalent frequency LSB for the desired DDS update. The generating a coherent phase step can generate the coherent phase by multiplying the FTW by the current phase of the LSB accumulator and utilizing a fractional portion of the result. The fractional portion of the coherent phase can be that portion of the product that is less than 360 degrees with the LSBs truncated to fit the size of the phase register in the DDS.

While the invention has been described with references to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

APPENDIX A

PHASE COHERENCY SIMULATION

Input:
    Frequency 1 in Hz
    Frequency 2 in Hz
Output:
    Column 1: Time in nanoseconds
    Column 2: AD9858 phase value for frequency 1
    Column 3: Time 240-3600ns (rows 1-15) Calculated phase for frequency 1
            Time 3840-6480ns (rows 16-27) Calculated phase for frequency 2
            Time 6720-9840ns (rows 28-41) Calculated phase for frequency 1
note: overflow is due to converting numbers to their corresponding 32 bit values which models the 32 bit values used in hardware.
function [phase_comparison]=phase_coherency(frequency1, frequency2)
    result is an array of the counter value and the corresponding phase value for the frequency
    q=quantizer([32,0],'wrap');
    r=quantizer([64,0],'wrap');
Frequency Tuning Word 1
FTW1=frequency1*2^32/1e9;
forces FTW to the 32 bit value it would have in hardware (drops fraction and keeps frequency within allowable range)
FTW1=num2bin(q,FTW1);
FTW1=bin2num(q,FTW1);
Frequency Tuning Word 2
forces FTW to the 32 bit value it would have in hardware (drops fraction and keeps frequency within allowable range)
FTW2=num2bin(q,FTW2);

APPENDIX A-continued

PHASE COHERENCY SIMULATION

```
FTW2=bin2num(q,FTW2);
9858 Actual phase
    accum_value=FTW1;
create an array of the 9858 phase accumulator values
the 9858 accumulates the FTW at 1 GHz (every 1 ns)
the index of accum_value array is the time in 1ns steps
for i=1:10000
accum_value(i+1)=accum_value(i)+FTW1;
end;
phase=num2bin(q,accum_value);
pull off the bits for the phase word (upper 14 bits)
phase=phase(:,1:14);
phase_word=bin2num(q,phase);
FPGA calculated coherent phase
phase_counter=240;
the phase counter accumulates 240 at 4.166 MHz (every 240ns)
the index of the phase_counter is the time in 240ns steps
for j=10000/240
    phase_counter(j+1)=phase_counter(j)+240;
end;
forces the phase counter to the 32 bit value it would have in hardware
phase_counter=num2bin(q,phase_counter);
phase_counter=bin2num(q,phase_counter);
calculate the coherent phase by multiplying the phase counter by the FTWs
changes to frequency 2 at 3840ns and back to frequency 1 at 6720ns.
for m=1:10000/240
    if m<16
        coherent_phase(m)=phase_counter(m)*FTW1;
    end;
    if m>=16
        coherent_phase(m)=phase_counter(m)*FTW2;
    if m>=28
        coherent_phase(m)=phase_counter(m)*FTW1;
    end;
end;
the coherent phase equals the first 14 bits of the lower 32 bit word from
the 64 bit product of phase_counter × FTW
this corresponds to bits 31 downto 18 in vhdl
(matlab index 1 to 64 versus vhdl index 63 downto 0)
coherent_phase=num2bin(r,coherent_phase);
coherent_phase=coherent_phase(:,33;46);
coherent_phase=bin2num(q,coherent_phase);
for m=1:10000/240
compare values of FPGA calculated coherent phase and 9858 actual phase
every 240ns
the index of the phase_comparison array is time in 240ns steps
for k=1:10000/240
    time
    phase_comparison(k,1)=k*240;
    value of 9858 phase word converted into degrees at increments of 240ns
    phase_comparison(k,2)=phase_word(k*word)*360/2^14;
    coherent phase converted into degrees calculated by FPGA
    phase_comparison(k,3)=coherent_phase(k)*360/2^14;
end;
```

APPENDIX B

COHERENT PHASE ALGORITHM

```
The IEEE standard 1164 package, declares std_logic, rising_edge( ), etc. library IEEE;
use IEEE.std_logic_1164.all;
use IEEE.std_logic_arith.all;
use IEEE.std_logic_unsigned.all;
library SYNOPSYS;
use SYNOPSYS.attributes.all;
entity phase_acc is
        port (
        current_freq: in STD_LOGIC_VECTOR (31 downto 0);
        current_phase: in STD_LOGIC_VECTOR (31 downto 0);
        reset: in STD_LOGIC;
        clk_62: in STD_LOGIC;
        time0: in std_logic;
        sweep: in std_logic;
        coherent_phase: out STD_LOGIC_VECTOR (13 downto 0)
```

APPENDIX B-continued

COHERENT PHASE ALGORITHM

```
        );
end phase_acc;
architecture phase_acc_arch of phase_acc is
        SIGNAL freq_fraction: STD_LOGIC_VECTOR(12 DOWNTO 0);
        SIGNAL div_by_4: STD_LOGIC_VECTOR(1 DOWNTO 0);
        SIGNAL acc_cnt: STD_LOGIC_VECTOR(13 DOWNTO 0);
        SIGNAL sync_acc_cnt: STD_LOGIC_VECTOR(13 DOWNTO 0);
        SIGNAL mult_out: STD_LOGIC_VECTOR(35 DOWNTO 0);
        SIGNAL adder_out: STD_LOGIC_VECTOR(13 DOWNTO 0);
        SIGNAL latch_sweep: STD_LOGIC;
        SIGNAL div_by_4tc: STD_LOGIC;
        SIGNAL ce_15m: STD_LOGIC;
        SIGNAL no_fraction: STD_LOGIC;
Xilinx CoreGen 14 bit unsigned adder.
        component add_14u
            port (
            A: IN std_logic_VECTOR(13 downto 0);
            B: IN std_logic_VECTOR(12 downto 0);
            Q: OUT std_logic_VECTOR(26 downto 0));
        end component;
Xilinx CoreGen 14 bit by 13 bit unsigned multiplier.
        component multi14x13u
            port (
            a: IN std_logic_VECTOR(13 downto 0);
            b: IN std_logic_VECTOR(12 downto 0);
            q: OUT std_logic_VECTOR(26 downto 0));
        end component;
begin
Divide 62.5MHz clock by 4 to generate 15.625MHz clock enable.
div4_counter:process (reset, clk_62)
begin
        if clk_62='1' and clk_62'event then
            if reset='1' then
                div_by_4 <= "00";
            else
                div_by_4 <= div_by_4 + 1;
            end if;
        end if;
end process;
Terminal count for update counter.
div_by_4tc <= '1' when (div_by_4(1 downto 0) = "11") else '0';
Deglitch and sync terminal count from update counter.
update_geglitch:process (clk_62)
begin
        if clk_62='1' and clk_62'event then
            ce_15m <= div_by_4tc;
        end if;
end process;
Accumulator / Counter to keep track of phase for a 953.6743164 Hz signal.
update_new_data:process (reset, clk 62)
begin
        if clk_62='1' and clk_62'event then
            if reset='1' then
                acc_cnt(13 downto 0) <= "00000000000000" then
            elseif ce_15m='1' then
                acc_cnt(13 downto 0) <= acc_cnt(13 downto 0) + 1;
            end if;
        end if;
end process;
Sample phase accumulator, and sweep input at the start of update cycle.
New data from this module should be present after 6 clocks from the update strobe.
update_new_data:process (reset, clk 62)
begin
        if clk_62='1' and clk_62'event then
            if reset='1' then
                latch_sweep <= '0';
                sync_acc_cnt(13 downto 0) <= "00000000000000";
            elseif time0='1' then
                latch_sweep <= sweep;
                sync_acc_cnt(13 downto 0) <= acc_cnt(13 downto 0);
            end if;
        end if;
end process;
Dedicated Resource 18 x 18 Multiplier block for frequency to phase conversion.
Coregen 14 x 13 unsigned multiplier, latency = 3 clocks.
freq_to_phase : multi14x13u
        port map (
```

APPENDIX B-continued
COHERENT PHASE ALGORITHM

```
        clk => clk_62,
        a => sync_acc_cnt(13 downto 0),
        b => freq_fraction(12 downto 0),
        q => mult_out(26 downto 0));
Generate fractional part of frequency for phase correction of current frequency.
freq_fraction(12 downto 0) <= 0 & current_freq(11 downto 0);
Coregen 14 x 14 unsigned adder for phase correction, latency = 1 clock.
phase_correct_adder : add_14u
    port map (
        A => mult_out(25 downto 12),
        B => current_phase(13 downto 0),
        C => adder_out(13 downto 0)),
        CLK => clk_62;
Multiplexer to synchronize phase coherent output.
In sweep mode do not alter the phase data.
sync_phase:process (clk_62, reset, latch_sweep)
begin
    if clk_62'event and clk_62='1' then
        if reset='1' then
            coherent_phase(13 downto 0) <= "00000000000000";
        else
            case latch_sweep is
                when '0' => coherent_phase(13 downto 0) <= adder_out(13 downto 0);
                when '1' => coherent_phase(13 downto 0) <= current_phase(13 downto 0);
                when others => NULL;
            end case;
        end if;
    end if;
end process;
end phase_acc_arch;
```

APPENDIX C
AUTOMATIC TEST BENCH FOR PHASE ACCUMULATOR

```
library ieee,synopsys;
use ieee.std_logic_unsigned.all;
use ieee.std_logic_arith.all;
use ieee.std_logic_1164.all;
use synopsys.attributes.all;
entity phase_acc_tb is
end pahse_acc_tb;
architecture TB_ARCHITECTURE of phase_acc_tb is
    Component declaration of the tested unit
    component phase_acc
    port(
        current_freq : in std_logic_vector(31 downto 0);
        current_phase : in std_logic_vector(31 downto 0);
        reset : in std_logic;
        clk_62 : in std_logic;
        time0 : in std_logic;
        sweep : in std_logic;
        coherent_phase : out std_logic_vector(13 downto 0) );
    end component;
    Stimulus signals - signals mapped to the input and inout ports of
    tested entity
    signal current_freq : std_logic_vector(31 downto 0);
    signal current_phase : std_logic_vector(31 downto 0);
    signal current_freq_tb : std_logic_vector(31 downto 0);
    signal current_phase_tb : std_logic_vector(31 downto 0);
    signal reset : std_logic;
    signal clk_62 : std_logic;
    signal time0 : std_logic;
    signal time0stamp : std_logic;
    signal sweep : std_logic;
    Observed signals - signals mapped to the output ports of tested entity
    signal coherent_phase : std_logic_vector(13 downto 0);
    Add your code here . . .
    shared variable end_sim : boolean := false;
    constant clk_period: time := 16 ns;
begin
    Unit under test port map
    UUT : phase_acc
```

APPENDIX C-continued
AUTOMATIC TEST BENCH FOR PHASE ACCUMULATOR

```
    port map (
        current_freq => current_freq,
        current_phase => current_phase,
        reset => reset,
        clk_62 => clk_62,
        time0 => time0,
        sweep => sweep,
        coherent_phase => coherent_phase,
    );
    Add your stimulus here . . .
    Generate 62.5 MHz clock every 16nsec.
    Generate Time ) Stamp every 240nsec, 16nsec wide.
clock_gen: process
begin
    if end_sim=false then
        clk_62 <= '0';
        time0stamp <= '0';
        wait for clk_period/2;
        clk_62 <= '1'; --1;
        wait for clk_period/2;
        clk_62 <= '0';
        wait for clk_period/2;
        clk_62 <= '1'; --2;
        wait for clk_period/2;
        clk_62 <= '0';
        wait for clk_period/2;
        clk_62 <= '1'; --3;
        wait for clk_period/2;
        clk_62 <= '0';
        wait for clk_period/2;
        clk_62 <= '1'; --4;
        wait for clk_period/2;
        clk_62 <= '0';
        wait for clk_period/2;
        clk_62 <= '1'; --5;
        wait for clk_period/2;
        clk_62 <= '0';
        wait for clk_period/2;
```

APPENDIX C-continued

AUTOMATIC TEST BENCH FOR PHASE ACCUMULATOR

```
                clk_62 <= '1'; --6;
                wait for clk_period/2;
                clk_62 <= '0';
                wait for clk_period/2;
                clk_62 <= '1'; --7;
                wait for clk_period/2;
                clk_62 <= '0';
                wait for clk_period/2;
                clk_62 <= '1'; --8;
                wait for clk_period/2;
                clk_62 <= '0';
                wait for clk_period/2;
                clk_62 <= '1'; --9;
                wait for clk_period/2;
                clk_62 <= '0';
                wait for clk_period/2;
                clk_62 <= '1'; --10;
                wait for clk_period/2;
                clk_62 <= '0';
                wait for clk_period/2;
                clk_62 <= '1'; --11;
                wait for clk_period/2;
                clk_62 <= '0';
                wait for clk_period/2;
                clk_62 <= '1'; --12;
                wait for clk_period/2;
                clk_62 <= '0';
                wait for clk_period/2;
                clk_62 <= '1'; --13;
                wait for clk_period/2;
                clk_62 <= '0';
                wait for clk_period/2;
                clk_62 <= '1'; --14;
                wait for clk_period/2;
                clk_62 <= '0';
                wait for clk_period/2;
                clk_62 <= '1'; --15;
                wait for clk_period/2;
        else
                wait;
        end if;
end process;
Generate Time 0 Stamp which occurs every 240ns, align with Update
strobe.
Stime0_strobe:process (Time0stamp, clk_62)
begin
        if clk_62='1' and clk_62'event then
                if time0='1' then
                        current_freq(31 downto 0) <= current_freq_tb(31
                        downto 0);
                        current_phase(31 downto 0) <= current_phase_tb(31
                        downto 0);
                end if;
        end if;
end process;
DDS Frequency = ((FTW × SYSCLK) / 2 to the nth)
FTW = current_freq.
SYSCLK = 1GHz.
n = 32 (2 to the nth = 4294967296).
FTW1 = 125 MHz = 0x20000000.
FTW2 = 80.00040054 MHz = 0x147AE800.
stim: process
begin
Test Reset.
        current_freq_tb(31 downto 0) <= X"00000000";
        current_phase_tb(31 downto 0) <= X"00000000";
        reset <= '1';
        sweep <= '0';
        wait for 480 ns;
        reset <= '0';
        wait for 480 ns;
Frequency 1.
        current_freq_tb(31 downto 0) <= X"20000000";
        wait for 4800 ns;
Frequency 2.
        current_freq_tb(31 downto 0) <= X"147AE800";
        wait for 1200000 ns;
```

APPENDIX C-continued

AUTOMATIC TEST BENCH FOR PHASE ACCUMULATOR

```
Phase Offset.
        current_phase_tb(31 downto 0) <= X"000001000";
        wait for 4800 ns;
        end_sim := true;
        wait;
end process;
end TB_ARCHITECTURE;
configuration TESTBENCH_FOR_phase_acc of phase_acc_tb is
        for TB_ARCHITECTURE
                for UUT : phase_acc
                        use entity work.phase_acc(phase_acc_arch);
                end for;
        end for;
end TESTBENCH_FOR_phase_acc;
configuration TIMING_FOR-phase of phase_acc_tb is
        for TB_ARCHITECTURE
                for UUT : phase_acc
The user should replace :
ENTITY_NAME with an entity name from a backnoted VHDL file,
ARCH_NAME with an architecture name from a backnoted VHDL file,
and uncomment the line below
                        use entity work.ENTITY_NAME (ARCH_NAME);
                end for;
        end for;
end TIMING_FOR_phase_acc;
```

We claim:

1. A phase persistent agile signal source method comprising:
   providing a direct digital synthesizer (DDS) clock rate;
   providing a frequency tuning word (FTW) for a desired output frequency;
   providing a DDS update for a desired DDS update rate;
   providing an equivalent frequency least significant bit (LSB) for the desired DDS update rate;
   providing a current phase of an LSB accumulator; and
   generating a coherent phase of the desired output frequency based on at least the DDS clock rate, FTW, DDS update rate to the DDS, equivalent LSB for the desired DDS update rate, and current phase of the LSB accumulator to maintain a time continuous phase of an output signal with the desired output frequency when the DDS is programmed to another output frequency and then back to the desired output frequency.

2. The method according to claim 1, wherein said providing an equivalent frequency step further comprises obtaining the equivalent frequency LSB of the desired DDS update rate by multiplying the LSB of the FTW by the DDS clock rate and dividing by the DDS update rate.

3. The method according to claim 1, wherein said providing a current phase step further comprises adding the current phase of the LSB accumulator to the equivalent frequency LSB for the desired DDS update.

4. The method according to claim 1, wherein said generating a coherent phase step further comprises generating the coherent phase by multiplying the FTW by the current phase of the LSB accumulator and utilizing the fractional portion of the result.

5. The method according to claim 4, wherein said fractional portion of the coherent phase is that portion of the coherent phase that is a fraction of a full cycle where a full cycle is comprised of 360 degrees.

6. A phase persistent agile signal source apparatus comprising:

an equivalent accumulator; and a direct digital synthesizer (DDS) communicatively connected to the equivalent phase accumulator and having a clock rate, wherein said phase persistent agile signal source apparatus is configured to operate at a sub-multiple of the clock rate to phase track an output frequency of the DDS to maintain a time continuous phase of an output signal having an output frequency of the DDS when the DDS is programmed to another output frequency and then back to the original frequency, and wherein said equivalent accumulator further comprises:

a least significant bit (LSB) accumulator a programmable register to program a frequency tuning word; and provides an equivalent frequency least significant bit;

provides a DDS update rate; and generates a coherent phase of the LSB accumulator.

7. The apparatus according to claim 6, wherein said LSB accumulator comprises: addition logic; and a register to store the current phase at the occurrence of a DDS update for a desired DDS update rate.

8. The apparatus according to claim 7, wherein said addition logic receives an equivalent frequency LSB for the desired DDS update rate.

9. The apparatus according to claim 6, wherein said apparatus is configured to obtain an equivalent frequency least significant bit for a desired DDS update rate by multiplying a least significant bit of the frequency tuning word by a direct digital synthesizer clock rate and dividing by the direct digital synthesizer update rate.

10. The apparatus according to claim 6, wherein said apparatus is configured to add a current phase of the least significant bit accumulator to the equivalent frequency least significant bit for a desired DDS update.

11. The apparatus according to claim 10, wherein the fractional portion of the coherent phase is a portion of the coherent phase that is a fraction of a full cycle where a full cycle is comprised of 360 degrees.

12. The apparatus according to claim 6, wherein said apparatus is configured to generate a coherent phase by multiplying the frequency tuning word by a current phase of the LSB accumulator and utilizing a fractional portion of the result.

13. A computer program product including a computer readable medium with phase persistent agile signal source instructions embodied thereon for carrying out steps comprising:

providing a direct digital synthesizer (DDS) clock rate;

providing a frequency tuning word (FTW) for a desired output frequency;

providing a DDS update for a desired DDS update rate;

providing an equivalent frequency least significant bit (LSB) for the desired DDS update rate;

providing a current phase of an LSB accumulator; and generating a coherent phase of the desired output frequency based on the DDS clock rate, FTW, DDS update rate to the DDS, equivalent LSB for the desired DDS update rate, and current phase of the LSB accumulator to maintain a time continuous phase of an output signal with the desired output frequency when the DDS is programmed to another output frequency and then back to the desired output frequency.

14. The computer program product according to claim 13, wherein said providing an equivalent frequency step further comprises obtaining the equivalent frequency least significant bit for the desired DDS update rate by multiplying the least significant bit of the FTW by the DDS clock rate and dividing by the DDS update rate.

15. The computer program product according to claim 13, wherein said providing a current phase step further comprises adding the current phase of the LSB accumulator to the equivalent frequency least significant bit for a desired DDS result.

16. The computer program product according to claim 13, wherein said generating a coherent phase step further comprises generating the coherent phase by multiplying the FTW by the current phase of the LSB accumulator and utilizing a fractional portion of the result.

17. The computer program product according to claim 16, wherein the fractional portion of the coherent phase is a portion of the coherent phase that is a fraction of a full cycle where a full cycle is comprised of 360 degrees.

18. The computer program product according to claim 13, further comprising coherent phase algorithm code.

19. The computer program product according to claim 13, further comprising phase coherency simulation code and automatic test bench for phase accumulator code.

* * * * *